(12) United States Patent
Herrera et al.

(10) Patent No.: US 10,140,540 B2
(45) Date of Patent: Nov. 27, 2018

(54) VEHICLE IMAGING SYSTEM

(71) Applicant: PERCEPTICS, LLC, Knoxville, TN (US)

(72) Inventors: Juan Antonio Herrera, Knoxville, TN (US); Anthony Scott Nelms, Knoxville, TN (US); Charles Andrew Cruey, Lenoir City, TN (US); Alfred Lawrence Marston, III, Knoxville, TN (US); Christopher Clair Richardson, Maryville, TN (US)

(73) Assignee: PERCEPTICS, LLC, Knoxville, TN (US)

( * ) Notice: Subject to any disclaimer, the term of this patent is extended or adjusted under 35 U.S.C. 154(b) by 105 days.

(21) Appl. No.: 15/171,401

(22) Filed: Jun. 2, 2016

(65) Prior Publication Data
US 2016/0358033 A1 Dec. 8, 2016

Related U.S. Application Data

(60) Provisional application No. 62/170,582, filed on Jun. 3, 2015.

(51) Int. Cl.
*G06K 9/00* (2006.01)
*G06K 9/32* (2006.01)
(Continued)

(52) U.S. Cl.
CPC ........... *G06K 9/325* (2013.01); *G06K 9/6821* (2013.01); *H04N 5/2251* (2013.01); *H04N 5/2353* (2013.01); *G06K 2209/01* (2013.01)

(58) Field of Classification Search
CPC .. G06K 9/6821; G06K 9/325; G06K 2209/01; H04N 5/2251; H04N 5/2353
(Continued)

(56) References Cited

U.S. PATENT DOCUMENTS 4,555,648 A * 11/1985 Iida ...................... H05B 41/325
315/150
5,948,038 A * 9/1999 Daly ........................ G08G 1/04
340/933

(Continued)

FOREIGN PATENT DOCUMENTS

CN 202373160 U * 12/2011 ................ G09B 5/04
DE 102011109594 A1 * 2/2013 ........... H04N 5/2251

OTHER PUBLICATIONS

Retreived from Internet on Nov. 12, 2017, Canon, Canon EOS Rebel T3 EOS 1100D instruction manual, 2012, retrieved from URL:<https://library.nau.edu/images/manual/t3_reference_manual.pdf>.*

*Primary Examiner* — Gregory F Cunningham
(74) *Attorney, Agent, or Firm* — Nelson Mullins Riley & Scarborough LLP

(57) ABSTRACT

A vehicle imaging system may include a first circuit board, and the system may also include an additional circuit board. The circuit boards may hold components for capturing images of vehicles as well as components for analyzing images of vehicles that have been captured. The analyzing may include performing optical character recognition on portions on images to identify characters in the images. A housing may enclose the circuit boards. The vehicle imaging system may be a license plate recognition system, a DOT number reader system, a hazardous material placard reader system, or a container code reader system, for example.

13 Claims, 18 Drawing Sheets

(51) Int. Cl.
  *H04N 5/225* (2006.01)
  *H04N 5/235* (2006.01)
  *G06K 9/68* (2006.01)

(58) Field of Classification Search
  USPC .......................................................... 382/105
  See application file for complete search history.

(56) References Cited

U.S. PATENT DOCUMENTS

| | | | |
|---|---|---|---|
| 7,187,858 B2 * | 3/2007 | Dowe | G03B 7/26 348/64 |
| 9,674,416 B2 * | 6/2017 | Chen | H04N 5/2256 |
| 2007/0025709 A1 * | 2/2007 | Gladnick | G01N 21/8806 396/4 |
| 2010/0077641 A1 * | 4/2010 | Greenwald | G09F 7/08 40/611.11 |
| 2013/0314534 A1 * | 11/2013 | Hinman | G06Q 10/08 348/143 |
| 2015/0163414 A1 * | 6/2015 | Nikkanen | H04N 5/353 348/229.1 |
| 2015/0356481 A1 * | 12/2015 | Mains | G06Q 10/06311 705/7.13 |

* cited by examiner

VEHICLE IMAGING SYSTEM

CROSS-REFERENCE TO RELATED APPLICATIONS

This application claims priority to and the benefit of U.S. provisional patent application No. 62/170,582, which was filed on Jun. 3, 2015, the entire contents of which are incorporated herein by reference.

BACKGROUND OF THE INVENTION

License plate recognition systems obtain images of license plates and analyze those images to determine the license plate numbers and other information contained on the license plates. FIG. 1 shows a conventional license plate recognition system 100. In this license plate recognition system 100, a vehicle travels in the direction of arrow 102 in a lane. An illuminator 104, such as a light source, illuminates the license plate at the rear of the vehicle so that camera 106 may capture a well-lit image of the license plate of the vehicle. Sensors 108 and 110 may be organized in pairs to detect the vehicle passing through the lane. The sensors 108 and 110 may be positioned to sense when the vehicle is entering the field of view of camera 114. Suitable sensors include photoelectric sensors, induction loops or laser range finders. The output of the sensors 108 and 110 may be used to trigger activation of illuminator 112 and camera 114. Alternatively, the license plate recognition system may operate in self-triggered mode, where the camera captures images at a constant rate and those images are analyzed for license plate candidates typically using the retro-reflectivity properties of most (but not all) plates to quickly determine when a license plate enters the field of view of the camera. Illuminator 112 illuminates the front of the vehicle so that the front license plate is well lit. The camera 114 images the front license plate. A lane enclosure 116 may hold electronic components for processing the images. When analog cameras are used, cables are used to transmit video signals to a frame grabber that is physically connected to a processor. For digital cameras, the frame grabber functionality is provided inside the camera and the output is transmitted to the processor in digital form. The processor is typically incorporated in a separate enclosure to protect it from the environment.

FIG. 2 depicts the partitioning of the components of a conventional license plate recognition system, such as the one depicted in FIG. 1. In particular, FIG. 2 shows what components are lane equipment 202 (i.e. positioned on the side of the lane and not enclosed in a separate protective enclosure) and what components are enclosed within a roadside enclosure 204. The lane equipment may include an illuminator 210, camera 212 and sensors, such as induction loops 214, such as described above relative to FIG. 1. The roadside enclosure 204 includes a frame grabber 216 that is interfaced with a processor, such as central processing unit (CPU) 218. As was mentioned above, the frame grabber 216 may be a separate component or may be integrated into the camera. The CPU 218 may communicate with a remote customer's network 206.

BRIEF SUMMARY OF THE INVENTION

A vehicle imaging system is provided that includes a first circuit board having components for capturing images of vehicles. The vehicle imaging system also includes a second circuit board that is tightly coupled to the first circuit board. The second circuit board has components for analyzing the images captured by the first circuit board. This analyzing includes performing optical character recognition on the images to identify characters in the images. A housing encloses both the first circuit board and the second circuit board.

The components for capturing images of vehicles may include an imaging device for capturing the images as well as a lens mount, a lens and an imaging sensor. Still further, there may be control logic for controlling the imaging device. Control logic may also be provided on the first circuit board for controlling the illuminator. Control logic for both the imaging device and the illuminator may be implemented in hardware, such as in a field programmable gate array (FPGA). The vehicle imaging system may be a license plate recognition system, a container code reader system, a hazardous material placard reader system, a Department of Transportation number reader system or a number of other types of systems.

The vehicle imaging system may be configured to capture front images of the vehicles, side images of the vehicles and/or rear images of the vehicles.

In an alternative embodiment, the vehicle imaging system may include a single circuit board that holds components for capturing images of vehicles and components for analyzing the captured images. The components may include a component for performing optical character recognition on text in the captured images. The circuit board is housed within a housing.

In accordance with another aspect of the present invention, the method is performed in the vehicle imaging system. Values are set in hardware in the vehicle imaging system. The values capture a delay between when an illuminator is triggered and when the illumination is produced and the delay between when a sensor is instructed to start the exposure and when the exposure actually starts. The illumination provided by the illuminator is synchronized with exposure by the sensor using hardware control logic based on the set values.

BRIEF DESCRIPTION OF THE DRAWINGS

Exemplary embodiments of the present invention are described below with reference to the following drawings.

DETAILED DESCRIPTION OF THE INVENTION

Figure 1:
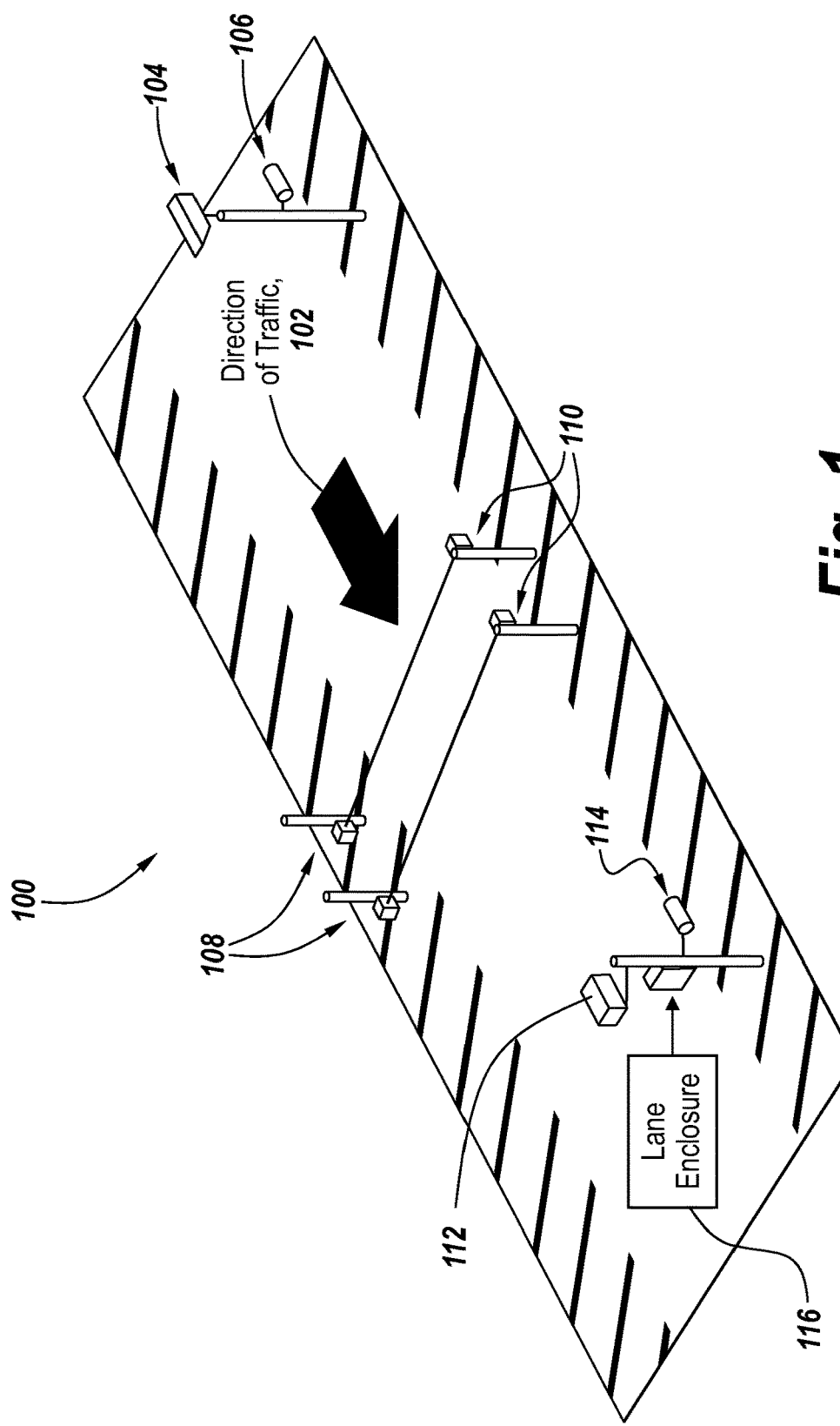
FIG. 1 depicts components of an exemplary conventional license plate recognition system.
Figure 2:
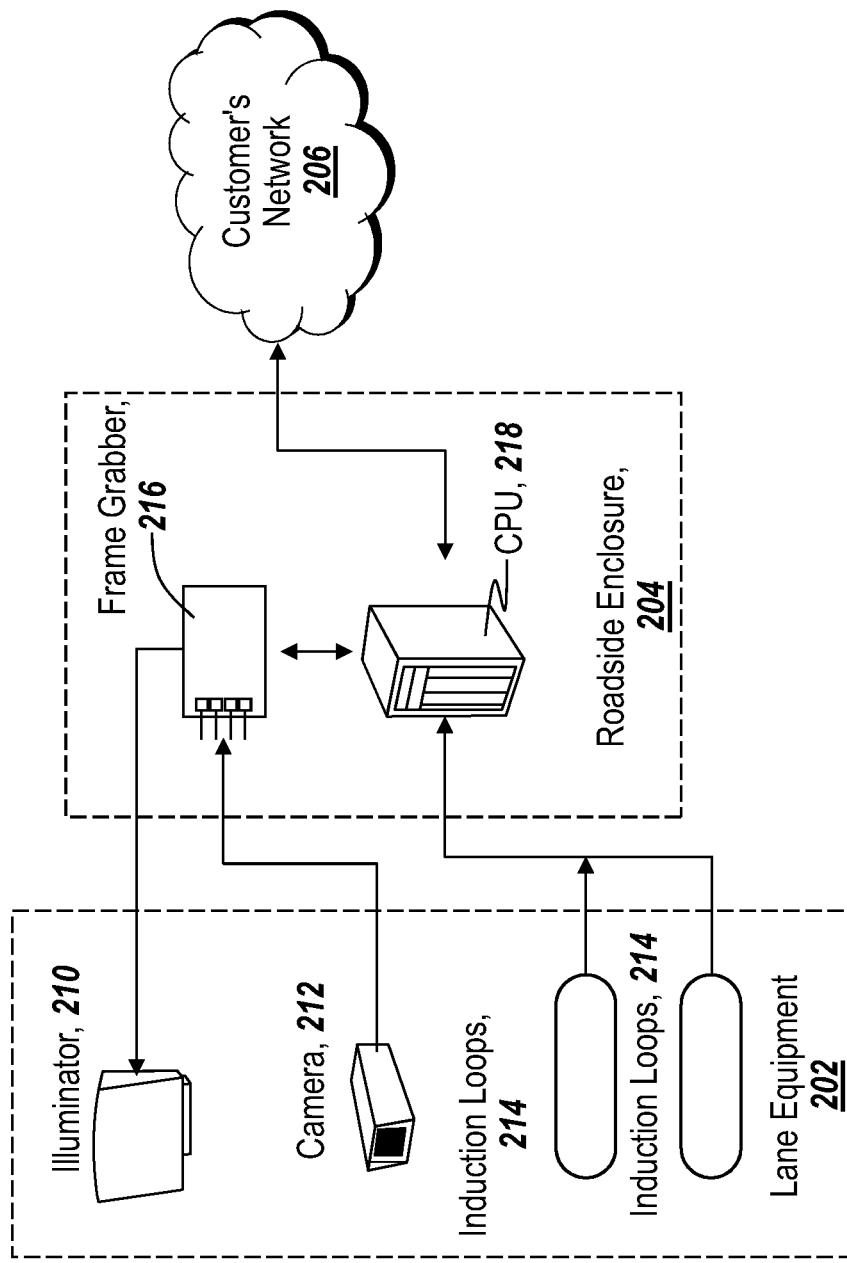
FIG. 2 depicts interaction between lane equipment, a roadside enclosure and customer's network in a conventional license plate recognition system.

There are a number of drawbacks with conventional license plate recognition systems. As was mentioned above, conventional license plate recognition systems use cables. Because the processors are separately housed from the camera, cables must be used to connect the camera and the illuminator to the processor enclosure. This adds complexity to such systems and provides potential failure points for the systems. The cables also may introduce noise. Moreover, the cables can negatively affect transmission speeds.

When conventional license plate recognition systems use software to synchronize events, such as to ensure that the target is illuminated at the same time that the camera's electronic shutter is activated, an embedded processor running a real time operating system is required in order to handle events in real time. Any delay between the instant an internal trigger signal is received and the moment the image is captured may result in the license plate being outside of the camera's field of view, or the image not being illuminated properly.

The exemplary embodiments described herein provide an imaging system that addresses the above-identified problems of conventional vehicle imaging systems. The embodiments described herein provide compact implementations that can operate in real time. The imaging components and analyzer components may be on a single printed circuit board or on two printed circuit boards that are tightly coupled to provide high speed interactions between imaging components and analyzer components. A connector, such as a surface mounted expansion connector, may interconnect the printed circuit boards. Moreover, there is no need for cables as the components are coupled together in a fashion that does not require cables. Still further, the exemplary embodiments may provide control of illuminators and imagers in hardware so as to be able to reliably and quickly synchronize their operation. A real-time operating system may execute on a processor provided within the system.

In the exemplary embodiments described herein, hardware components may handle time critical operations, such as synchronizing illumination and image capture. A processor may be provided to analyze the captured images without the need for handling tasks handled by other hardware components. This helps the processor to perform the analysis in real time.

The vehicle imaging systems of the exemplary embodiments described herein may take many forms, including but not limited to license plate recognition systems, U.S. Department of Transportation number reader systems, container ISO code readers, and hazardous material placard readers.

The invention supports several triggering modes, including: being triggered by an external discrete trigger signal or sequence of signals; being triggered by a network message, where the message indicates that the system should capture an image immediately upon receipt of the message, or after some amount of time detailed in the message; being self-triggered at a pre-determined constant time interval; or a combination of modes, such as in gated-mode, where the system enters a self-triggered mode while an external signal is active, and the system turns itself off when the signal is inactive.

Figure 3:
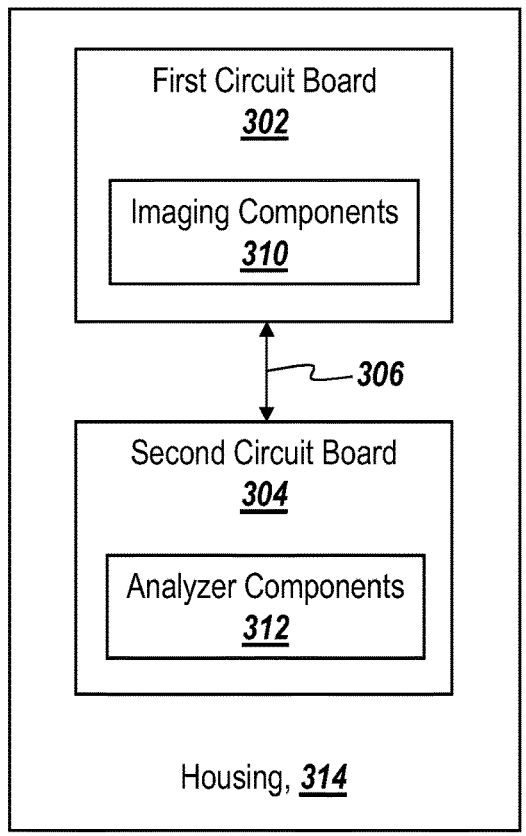
FIG. 3 depicts a high level view of a vehicle imaging system in which two circuit boards are deployed and are tightly coupled.

FIG. 3 depicts an exemplary vehicle imaging system wherein a first circuit board 302 is tightly coupled to a second circuit board 304 via an interface 306. The interface 306 may take different forms as will be described in more detail below. In the exemplary depiction of FIG. 3, the first circuit board 302 holds imaging components 310 that are responsible for capturing images of the vehicles. The images are passed via the interface 306 from the imaging component 310 to the second circuit board 304 where the analyzer components 312 analyze those images in real time. The first circuit board 302, the second circuit board 304 and the interface 306 may be resident within a common housing 314.

Figure 4:
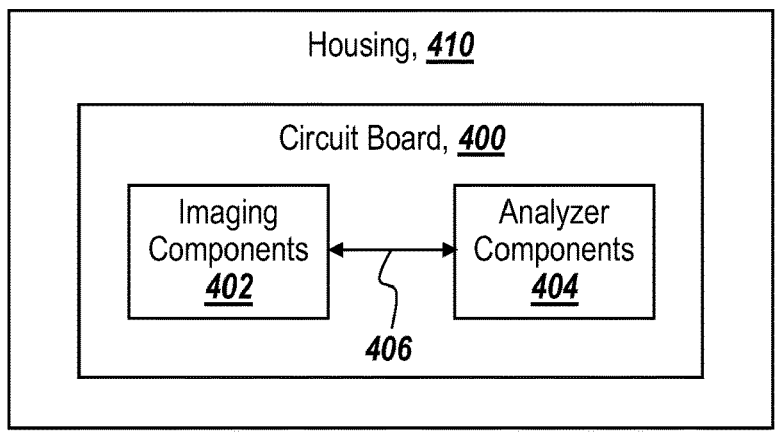
FIG. 4 depicts a vehicle imaging system in which imaging components and analyzer components are found on a single circuit board.

Alternatively, as shown in FIG. 4, the imaging components 402 and the analyzer components 404 may be resident on a single printed circuit board 400. An interface 406 permits communication between the imaging components 402 and the analyzer components 404. The printed interface 406 may take many forms, such as a bus, an electrical interconnect and the like. The printed circuit board 400 is resident within a housing 410.

Figure 5A:
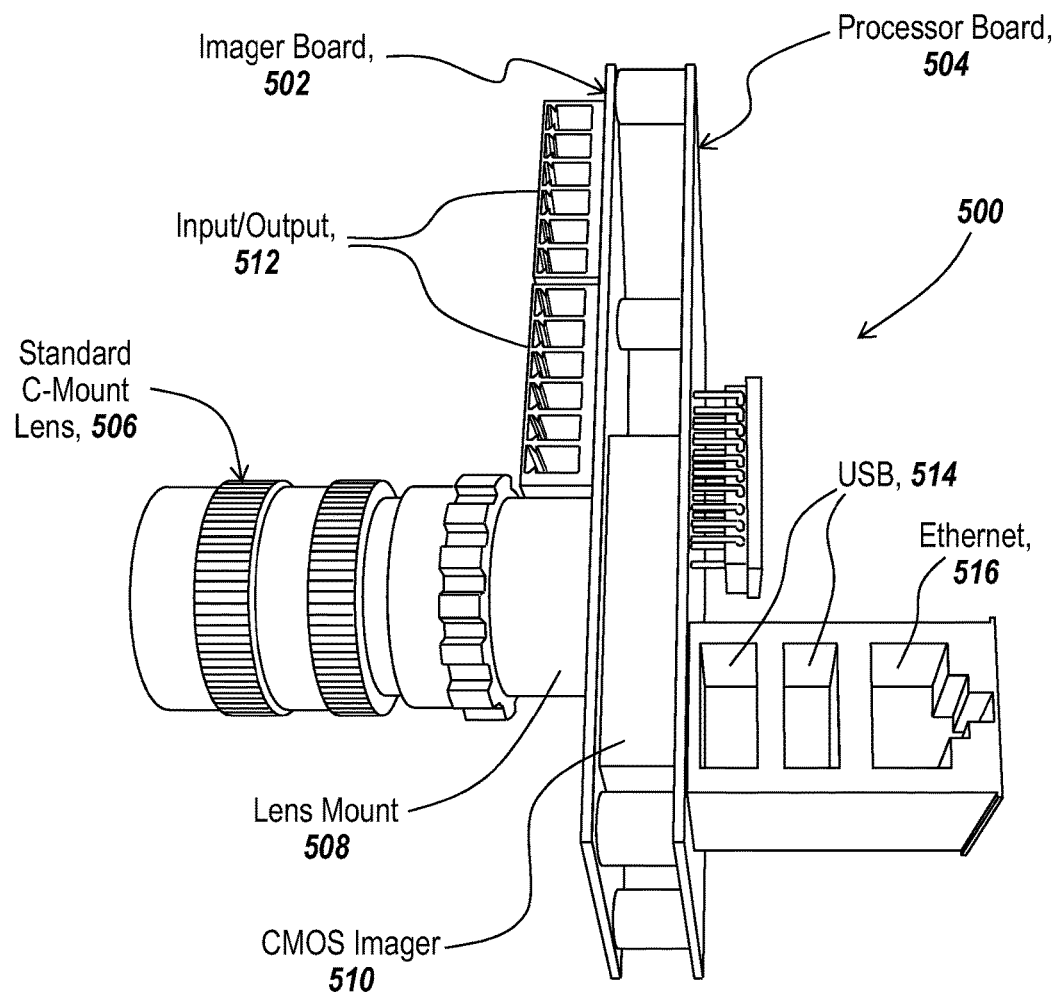
FIG. 5A depicts components found in an exemplary vehicle imaging system.

FIG. 5A shows an example of a vehicle imaging system 500 that deploys two printed circuit boards. The vehicle imaging system 500 includes an imager board 502 holding imaging components for capturing images and a processor board 504 that holds analyzer components for analyzing the images. In this exemplary embodiment, the imager board 502 is interconnected by a surface-mounted expansion connector with the processor board 504. Those skilled in the art will appreciate that other mechanisms for interconnecting may be used.

As shown in FIG. 5A, the vehicle imaging system 500 may include a lens mount 508 to which a standard C-mount lens 506 may be attached. The images obtained by the lens may pass to a complementary metal oxide semiconductor (CMOS) imager 510 that is resident on the imager board 502. The imager 510 need not be a CMOS imager but may take other forms as well. The imager board 502 may include a number of input/output ports 512.

Figure 5B:
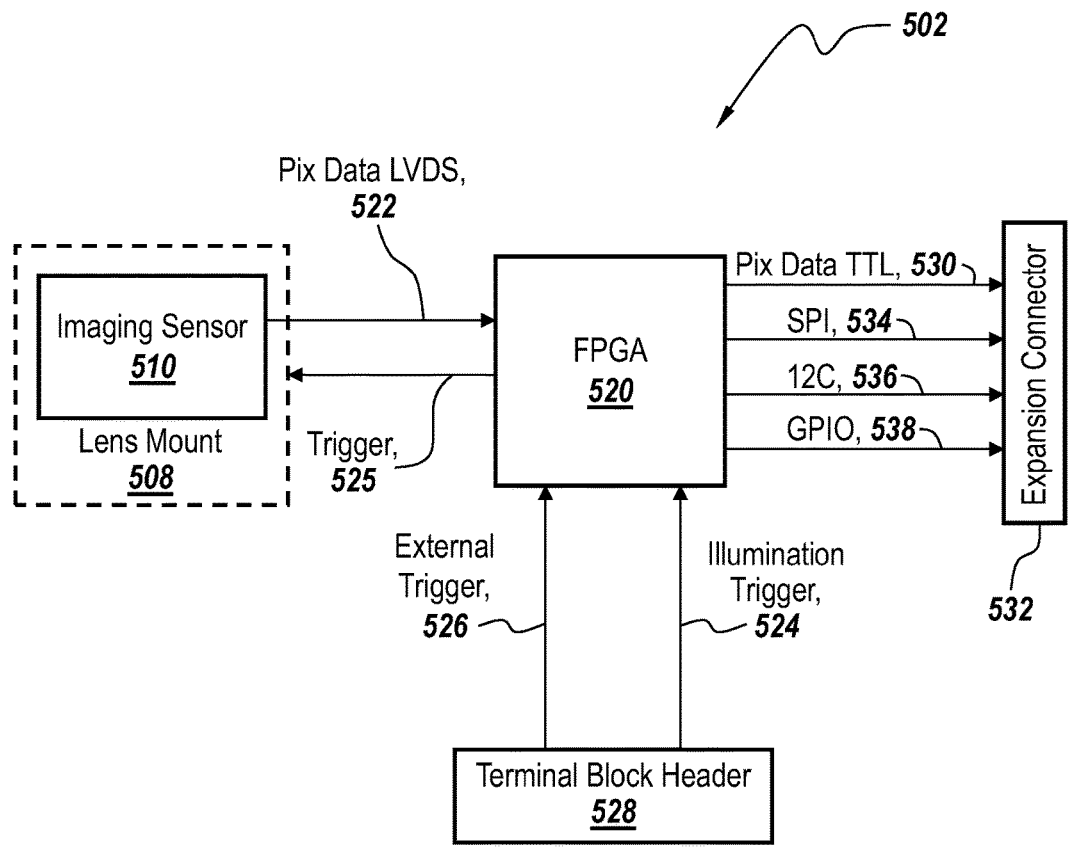
FIG. 5B depicts the flow of signals in components of the imaging circuit board.

FIG. 5B shows a functional diagram of the imager board 502. Images pass through the lens 506 that is coupled to the imager board 502 via the lens mount 508 and impinge upon the imaging sensor 510. The pixel data 522 associated with the image is sent from the image sensor 510 to a field programmable gate array (FPGA) 520. The FPGA 520 passes the pixels out to the processor board 504 over an expansion connector 532 that interconnect the two printed circuit boards 502 and 504. The FPGA may convert the pixel data from low-voltage differential signals (LVDS) 522 to transistor—transistor logic (TTL) signals 530. The FPGA 520 implements time critical operations for capturing the images such as synchronizing the illuminator with the imaging sensor. The FPGA 520 may send an illumination trigger 524 to the illuminator that is interconnected via a terminal block header 528. The FPGA 520 may send trigger 525 to the imaging sensor 510 to cause the imaging sensor to capture an image. In some instances, the FPGA may simply forward along an externally generated trigger 526, such as from a processor on the processor board 504.

The imager board 502 may communicate with components on the processor board 504. For example, the processor board 504 may use a Serial Peripheral Interface (SPI) to control and configure the imaging sensor. These SPI signals 534 may be received from and transmitted to an interface, such as expansion connector 532 that interconnects the imager board 502 and the processed board 504. General Purpose input/output 538 with GPIO registers on the processor board 504 may be received/transmitted via the expansion connector 532. Inter integrated circuit (I2C) bus input/output 536 may also be received/transmitted from/to the expersion connector 532.

Figure 5C:
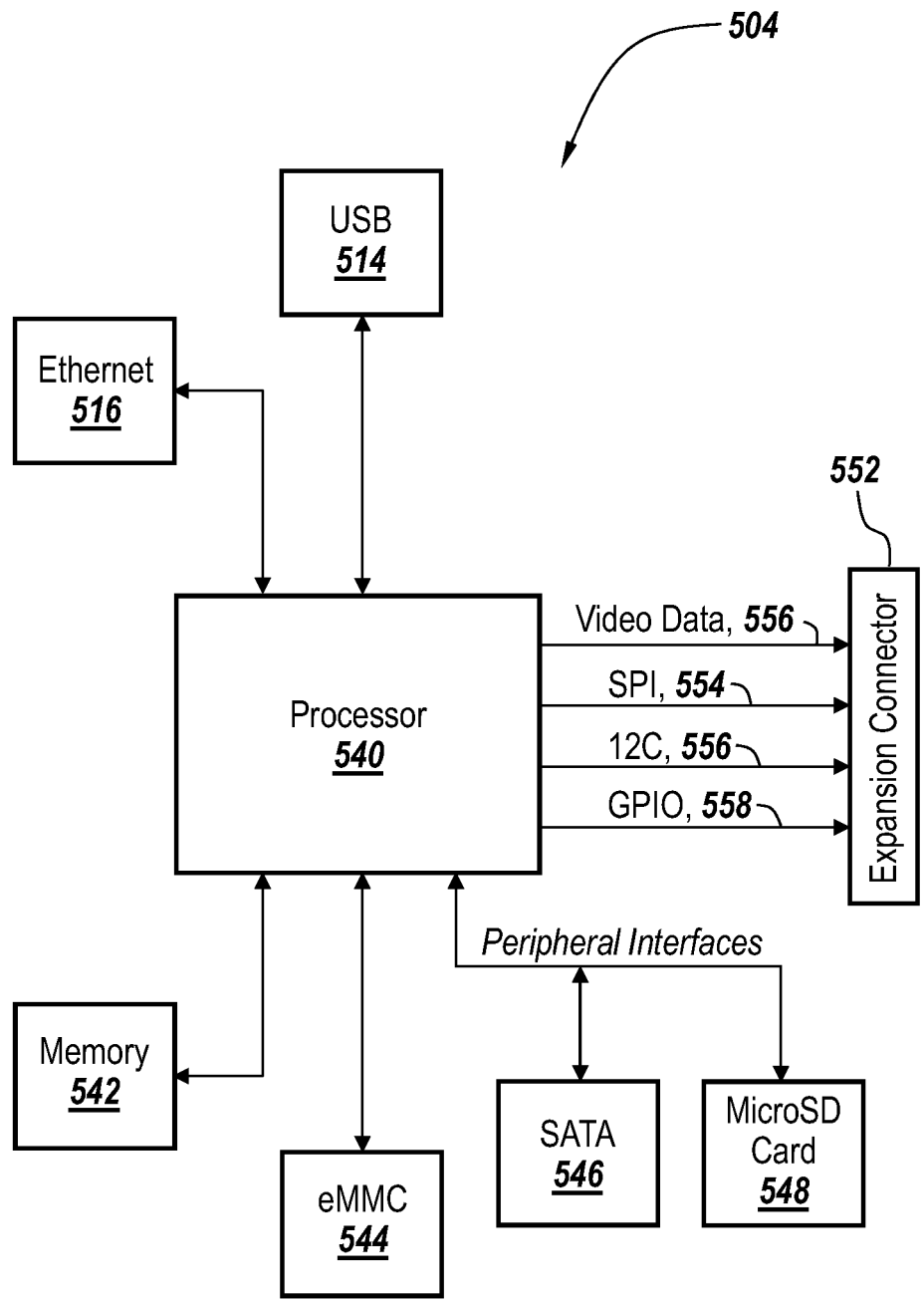
FIG. 5C depicts the flow of signals between components of the processor circuit board.

FIG. 5C shows a block diagram of the components found on the processor board 504. The processor board 504 includes a processor 540, such as a central processing unit (CPU). As mentioned above, there may be a universal serial bus (USB) connector 514 and Ethernet interface connector 516. The processor 540 has access to memory 542 and flash memory, such as embedded multimedia and (eMMC) storage 544. Programs and parameters may be stored on the eMMC 544. There may be peripheral interfaces, such as serial ATA (SATA) interface 546 and an interface to a Micro SD memory card 548. The video data 550 is received from the imager board 502 via an expansion connector 552.

As was mentioned above, the processor 540 uses SPI 554 to control the imaging sensors 510 (FIG. 5A). FIG. 5C shows the SPI input/output 554. As was also mentioned above, GPIO registers on the CPU are used to communicate with external devices. FIG. 5C shows the GPIO communications 558. The processor 540 may also communicate with an I2C bus 556. The I2C bus may, for example, be used to communicate with components or the imager board 502 (FIG. 5B)

Figure 6:
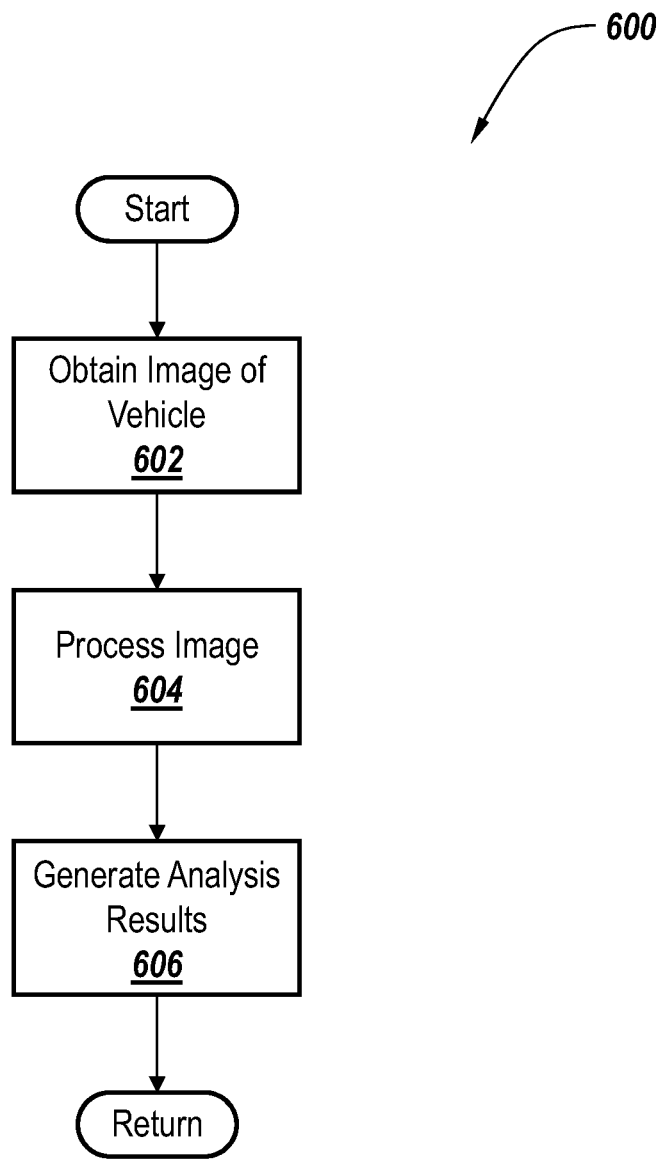
FIG. 6 is a flowchart depicting at a high level the steps that are performed in exemplary vehicle imaging system.

FIG. 6 provides a high level overview of operations performed in exemplary embodiments described herein. As shown in the flowchart 600, initially an image of a vehicle is obtained in step 602. As was discussed above, the image of the vehicle is received by the imaging sensor 510 and passed by the FPGA 520 to the processor 540 on the processor board 504. The processor 540 executes software to process the images in step 604. This software may perform image analysis, including among other things, optical character recognition (OCR). Those skilled in the art will appreciate that in alternative embodiments, the image may be processed by deploying hardware logic. The processing that is performed by the processor 540 is dependent on the application performed by the vehicle imaging system. The results of the processing are generated in step 606. These results may be stored in storage or passed on to an external network, such as a customer network or the like.

Figure 7:
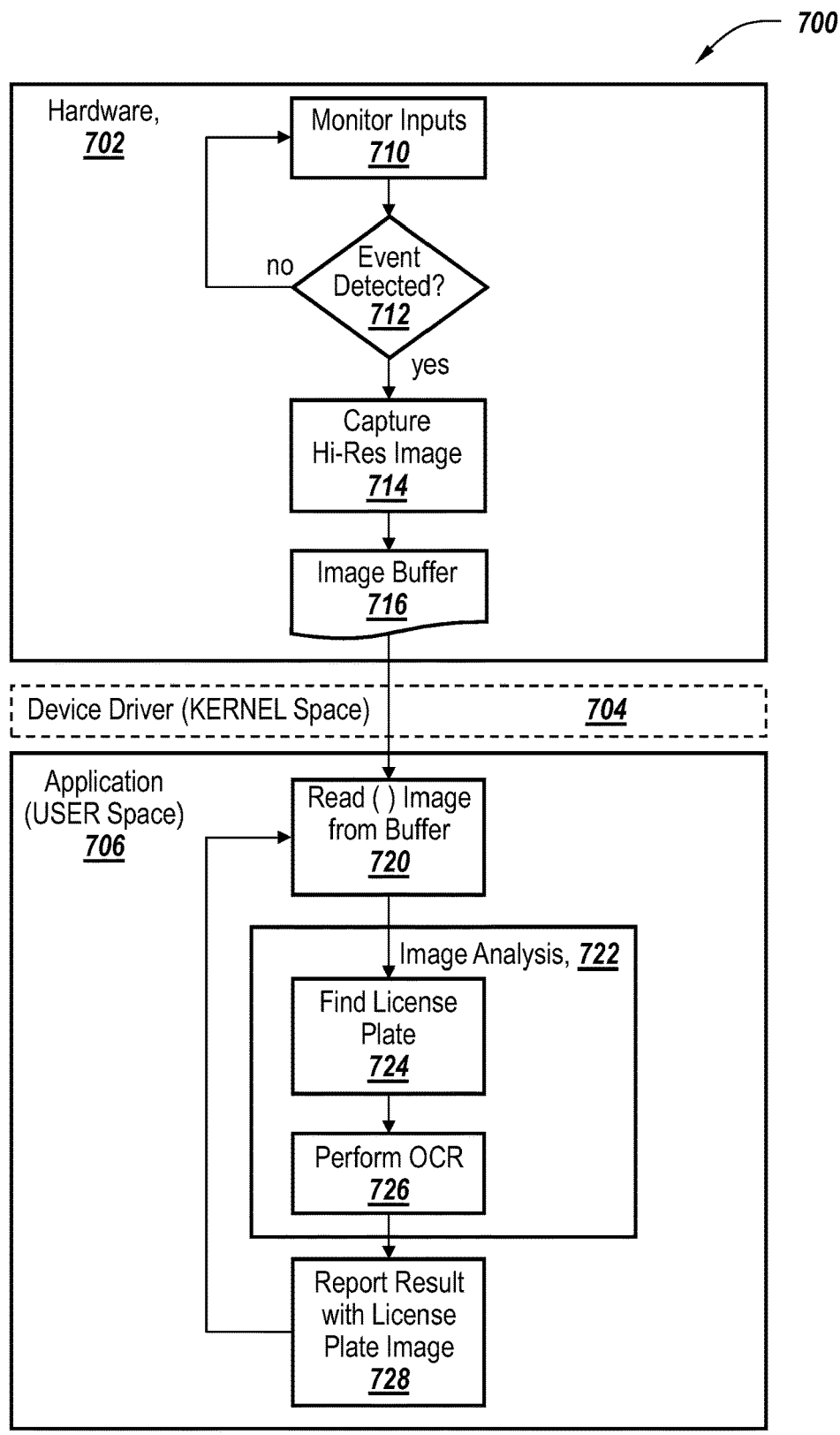
FIG. 7 is a flowchart depicting the steps performed with a hardware based vehicle detection mechanism in an exemplary vehicle imaging system.

As mentioned above, the vehicle imaging system may be a license plate recognition system. As was also mentioned above, the triggering of the illuminator and image capture may be performed solely in hardware. The flowchart 700 of FIG. 7 depicts steps that may be performed in such an environment. The flowchart 700 designates steps that are performed in hardware 702 and an application executing on the processor 540 in an application space 706. Initially, inputs may be monitored, such as input from the sensors in step 710. When an event is detected in step 712, an image of a vehicle is captured in step 714. This image is stored in the image buffer 716. The event may be for example, that the sensors indicate that a vehicle is in the field of view of the imager of the vehicle imaging system. The image buffer 716 may take many forms, such as various types of storage with different logical configurations. A device driver 704 may run on the processor 540 and may facilitate communication between the imager board 502 and the processor board 504 so that the processor 540 reads an image from the image buffer 716 in step 720. The read image is then analyzed as part of image analysis 722. The image analysis may be performed by software running on the processor 540.

First, the license plate is located within the captured image in step 724. A number of different conventional strategies may be used to locate the license plate in the captured image. These strategies generally look for rectangular regions containing same colored characters with a uniform background color. Such license plate localization strategies are known in the art. Then optical character recognition (OCR) is performed on characters of the license plate portion of the image in step 726. Conventional OCR strategies may be deployed to recognize characters in the image portion containing the license plate. The result of the OCR may be a license plate number and information regarding the state or province associated with the license plate. The result of the analysis is reported along with the license plate image in step 728.

Once one or more images containing a license plate are captured, a "license plate finder" algorithm is used to determine the exact location of the license plate in the image. This may be accomplished by searching for license plate characteristics (e.g., high-contrast objects) and/or character strings in the image that indicate the presence of a license plate. The license plate must be located in potentially busy images that contain other types of information that may appear as text (e.g., bumper stickers, other writing, contrasting image artifacts). In addition, the type and condition of the license plate (e.g., retro-reflective, non retro-reflective, license plate frames, license plate orientation) may require the use of special lighting and camera technologies to both locate and present the optimal license plate image to the character recognition algorithms.

For example, some license plate recognition systems can vary the illumination, shutter, and gain settings to capture multiple images per vehicle over a wide range of ambient and environmental conditions. By varying camera settings and controlling illumination, the ability to locate a license plate within an image can potentially be improved. In addition, the 'best' image can also be used to improve the accuracy of the subsequent character extraction and license plate number determination.

Figure 8:
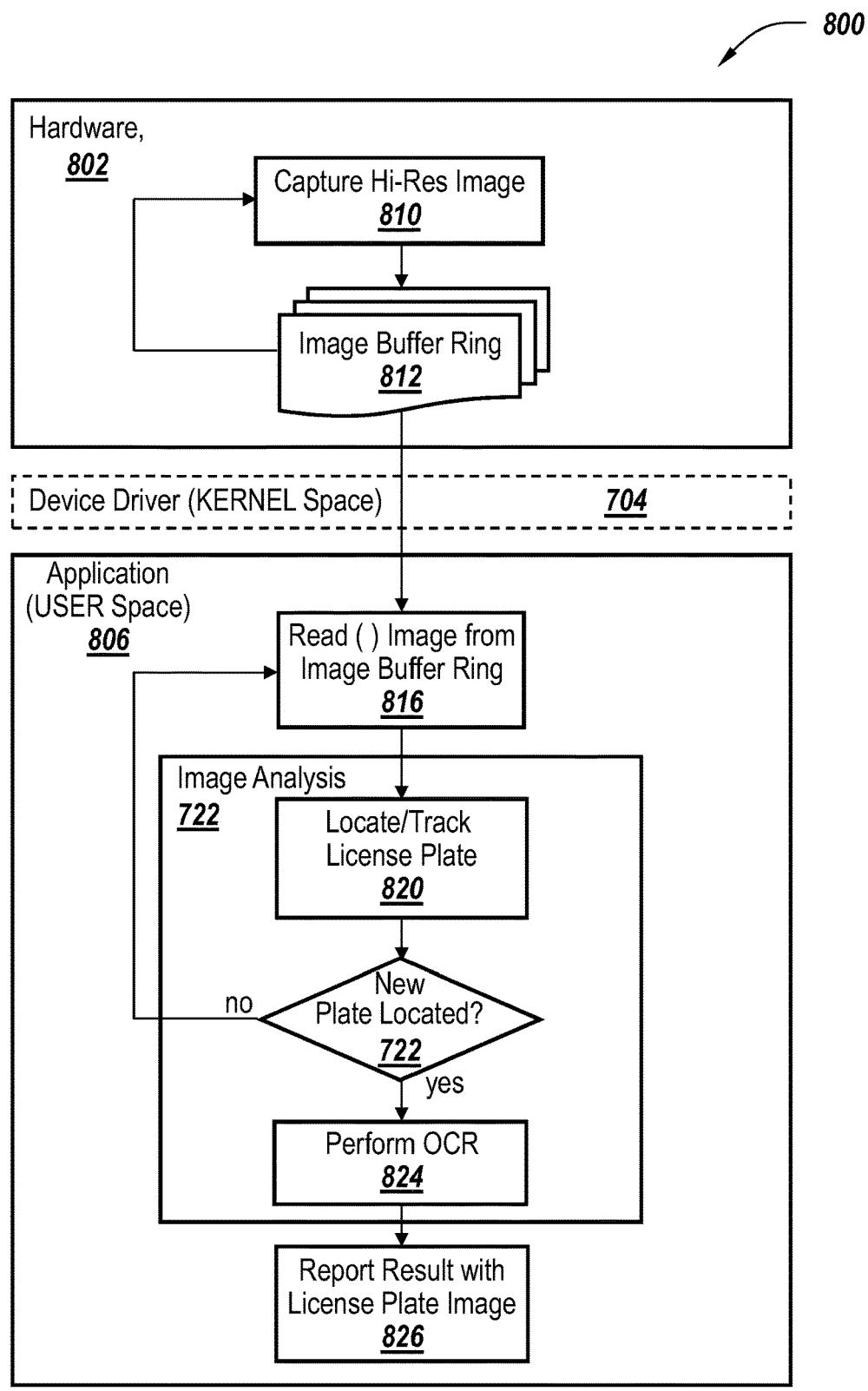
FIG. 8 is a flowchart depicting steps that are performed with a self-triggered mechanism in an exemplary vehicle imaging system.

FIG. 8 provides a flowchart of the steps performed the flowchart 800 in the steps performed when the operation of the vehicle imaging system is self-triggered. In this case, images are captured and the processor 540 (FIG. 5C) may determine when to read the images that capture in the buffer. The flowchart 800 shows the steps performed by the hardware 802 and by applications 806. The flowchart 800 also shows a device driver interface 804 between the application 806 and the hardware 802. Initially, a high resolution image may be captured 810 by the vehicle imaging system. An image buffer ring 812 may be implemented to deploy multiple buffers that operate in a circular fashion. The processor may read an image from the image buffer ring 816 when configured to do so in self triggered mode. The portion of the image that reflects the license plate may be located in step 820 as part of the image analysis 818. The portion of the image is analyzed to determine whether it reflects a license plate that has already been processed or not in step 822. If the portion of the image holding the license plate has not previously been processed, then OCR is performed on the portion of the image in step 824. The resulting license plate information is reported along with a portion of the image that shows the license plate in step 826.

Figure 9:
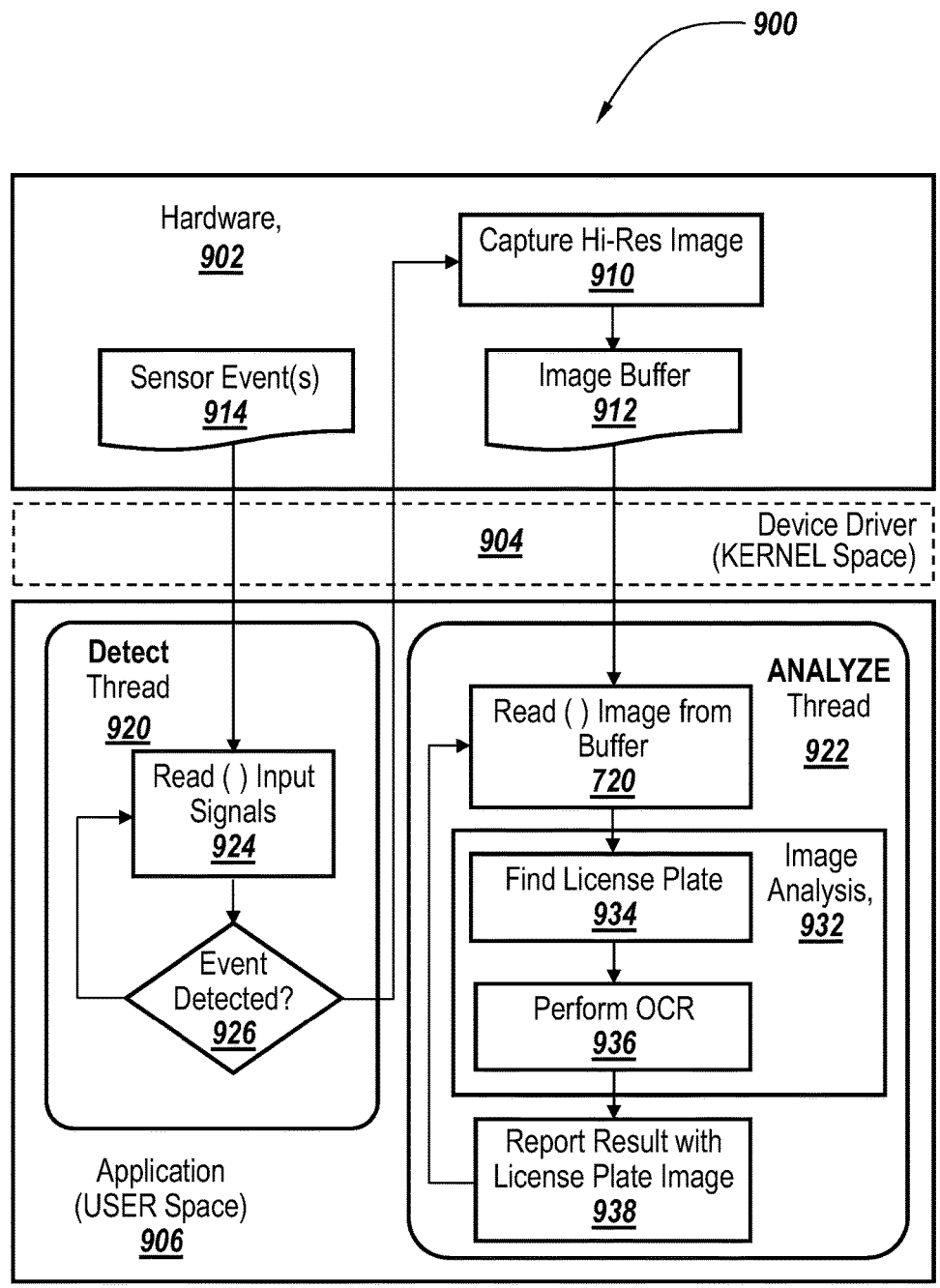
FIG. 9 is a flowchart illustrating steps performed when a software based detection mechanism is deployed in an exemplary vehicle imaging system.

FIG. 9 depicts the flowchart 900 wherein the triggering of the capturing of images is performed by software. The flowchart 900 depicts hardware 902, applications 906 and the device driver 904 as shaded regions.

Initially, a sensor event 914 is triggered in hardware 902 a dedicated Detect thread 920 reads the input signals from the sensors in step 924. If an appropriate event is detected based on the red input signals in step 926, a high-resolution image of the vehicle is capture in step 910. This image is stored in the image buffer 912.

A separate Analyze thread 922 may read the image from the image buffer 912 at the appropriate time in step 930. Image analysis 932 is then performed on the read image. The image analysis finds the license plate in the vehicle image in step 934, and OCR is performed in step 936. The resulting license plate information is reported along with the license plate image in step 938.

Figure 10:
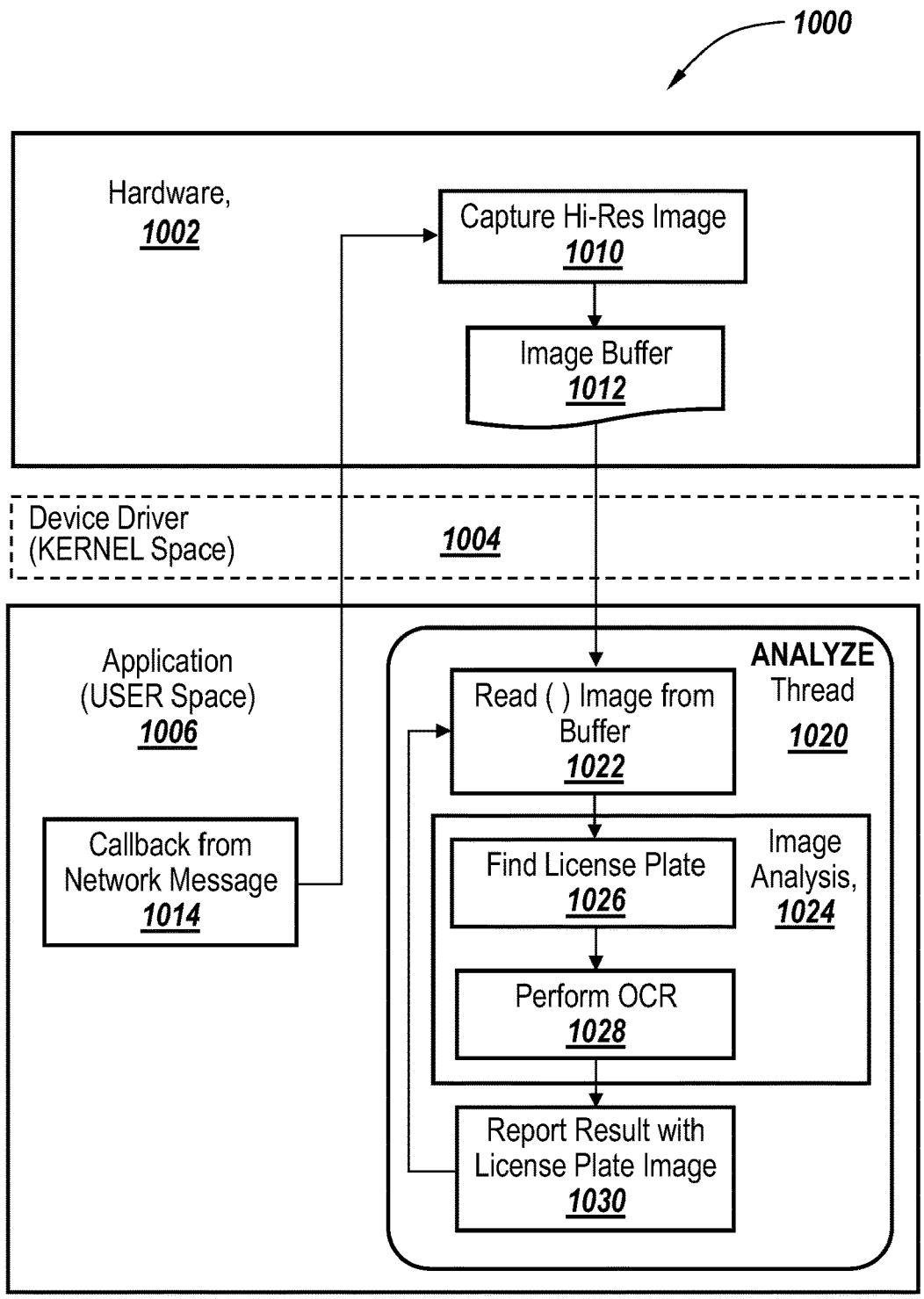
FIG. 10 is a flowchart that depicts steps that are performed when an external trigger message is used in an exemplary vehicle imaging system.

FIG. 10 depicts the case wherein the external trigger is deployed to trigger capturing of images and alike. The flowchart 1000 shown in FIG. 10, like the other flowcharts, depicts the steps performed in hardware 1002 as well as steps performed by applications 1006 and the device driver interface 1004. The external trigger takes the form of a callback from a network message 1014 that triggers the capturing of the high-resolution image 1010. Images stored in the image buffer 1012. Analyze thread 1020 executing on the processor 540 reads the image from the image buffer 1012 in step 1022. Image analysis 1024 is performed on the read image to find the license plate in step 1026 and perform OCR in step 1028. The corresponding license plate information is reported along with the portion of the image that captures the license plate in step 1030.

As is mentioned above, the synchronization of the illumination of the vehicle and the capturing of images of the vehicle may be triggered a number of different ways. The figures that follow walk through a number of the possibilities and illustrate the components involved in this triggering and synchronization.

Figure 11A:
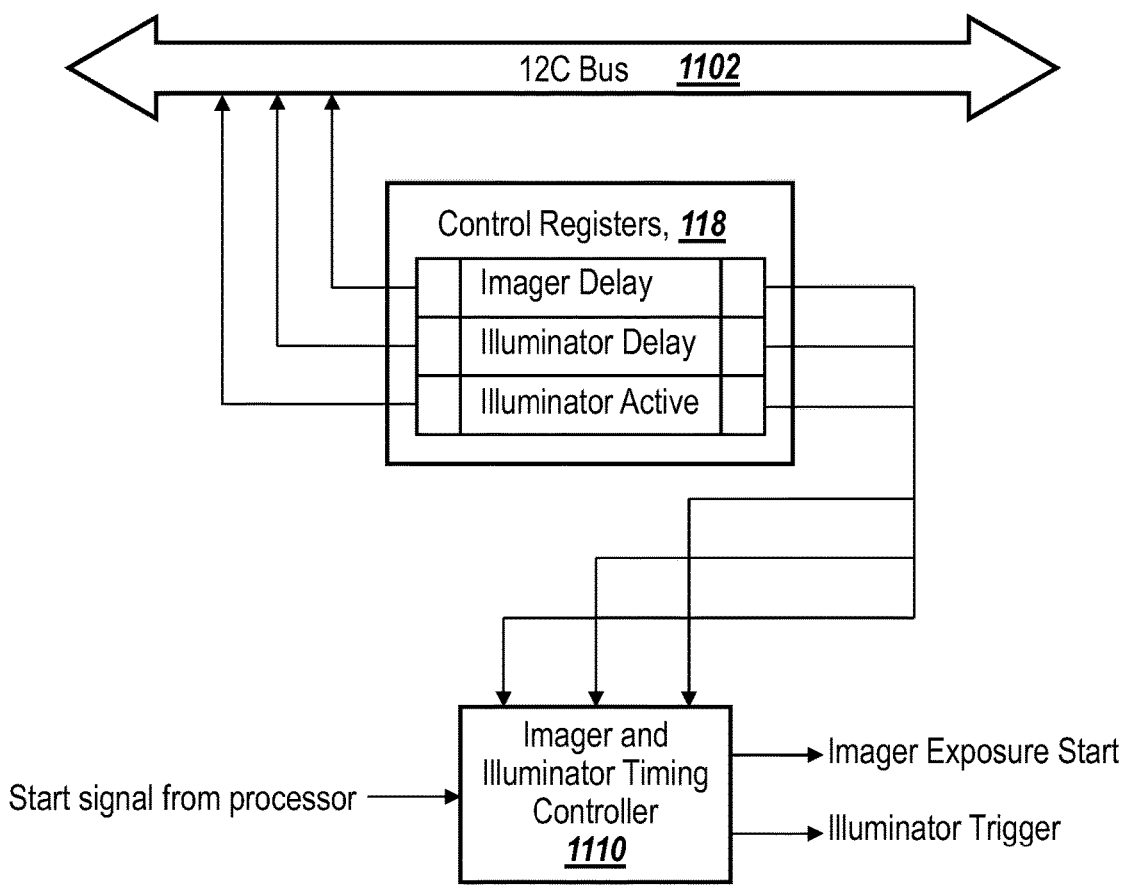
FIG. 11A depicts the interaction among components when a system is configured to trigger the imager and illuminator in response to a signal sent from the processor in an exemplary vehicle imaging system.

The synchronization of the exposure of the image sensor to the illumination provided by an illumination source is controlled by registers that are implemented in the FPGA 520 (FIG. 5B) in the imager board 502. The values in these control registers 1108 (See FIG. 11A) are accessible to the processor board 504 via the I2C bus 1102 that was referenced above. The control registers 1108 include an imager delay register that controls a relative timing of the start of the imager exposure and an illuminator delay register that controls the illuminator trigger. The illuminator active register controls the length of time that the illumination pulses on to ensure that the illuminator on-time matches the exposure time of the imager. The values in these control registers are accessible by an imager and illumination timing controller 1110 that is configured in the FPGA 520. The imager and illuminator timing controller 1110 is triggered by a start signal from the processor to generate the imager exposure start output and the illuminator trigger output.

Figure 11B:
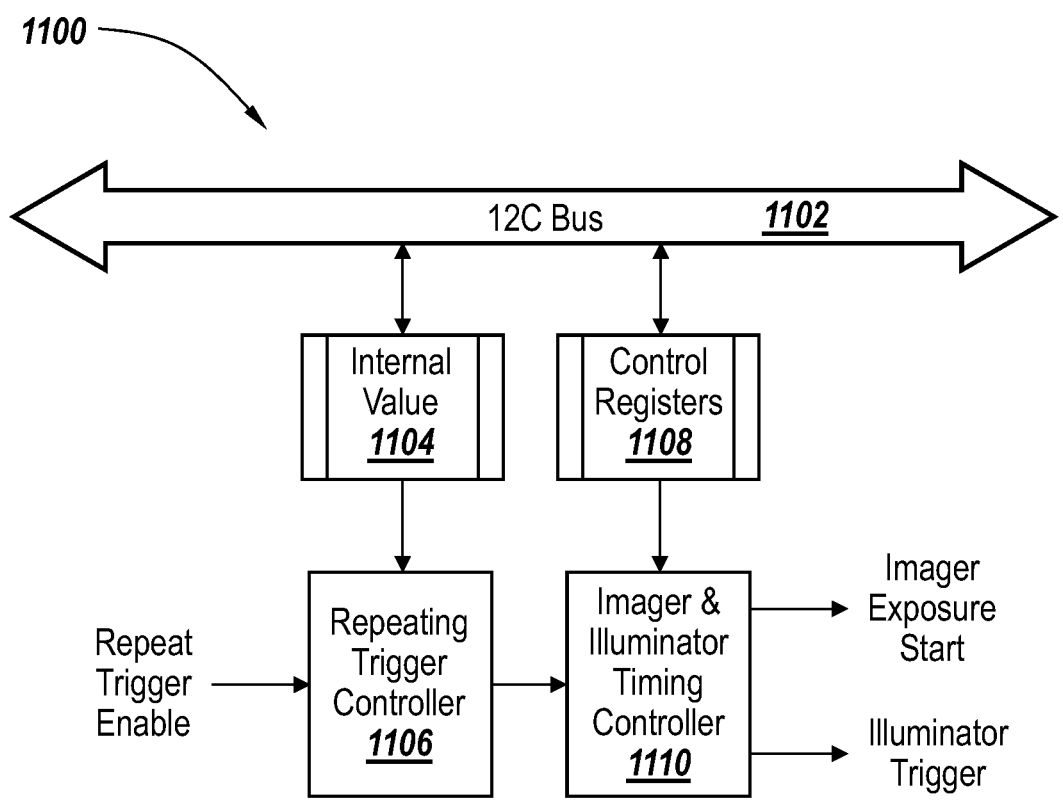
FIG. 11B depicts the interaction among components when a system is configured to repeatedly trigger the imager and illuminator at a constant interval in an exemplary vehicle imaging system.

FIG. 11B depicts the interaction among components to provide repeated automatic triggering of the imager(s) and illuminator(s) at a constant interval. This approach eliminates the need for software to keep track of the timing. The interval is based upon a value loaded in hardware control registers 1108. As shown in FIG. 11B, a repeat trigger enable signal enables a repeating trigger controller 1106. The repeating trigger control may be realized in the FPGA 520 (See FIG. 5B). An interval value 1104 is held in the hardware registers to specify the interval between triggering events. The interval value 1104 may be communicated from the processor 540 (FIG. 5C) via I2C bus 1102. The repeating trigger controller 1106 communicates with the imager and illuminator timing controller 1110 to specify that an illuminator trigger and image exposure start are needed. Control registers 1108 hold information that is used by the imager and illuminator timing controller 1110 to generate appropriately synchronized imager exposure output and illuminator trigger output as described previously relative to FIG. 11A.

Figure 12:
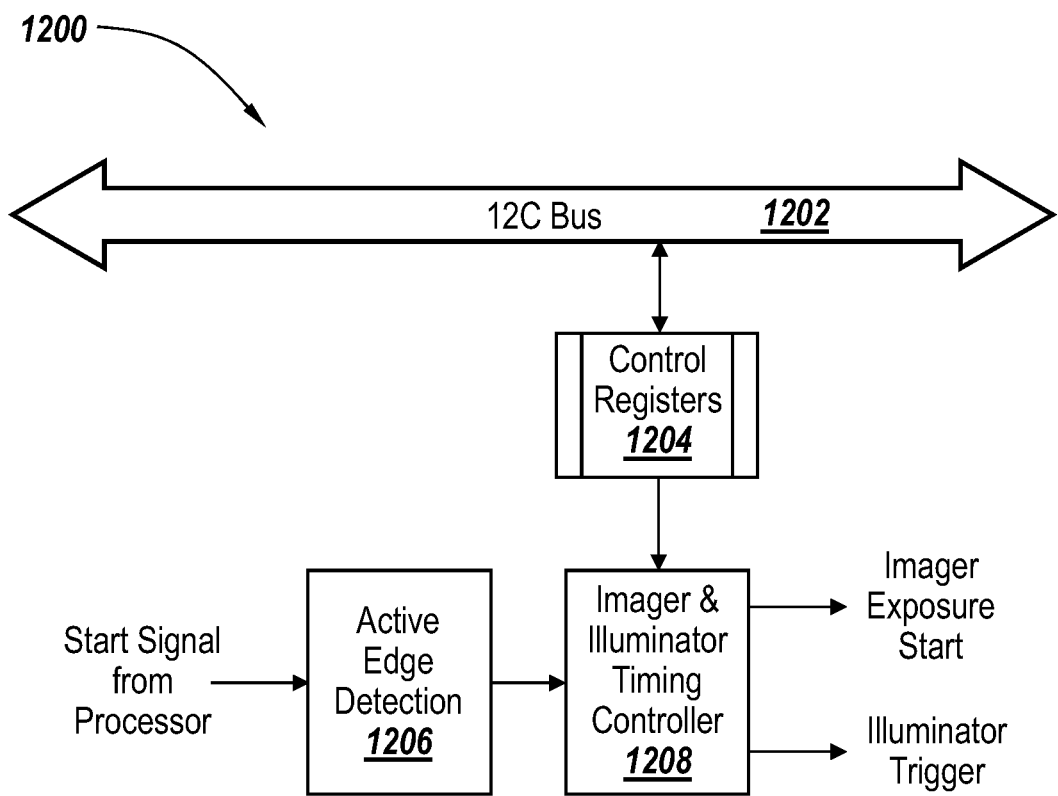
FIG. 12 depicts the interaction among components when image capture is captured by a signal sent from a processor in an exemplary vehicle imaging system.

FIG. 12 depicts interaction among components 1200 where the triggering is driven by the processor 540 (FIG. 5C). In the illustrated cases, the FPGA 520 (FIG. 5B) detects edge transitions on a processor 540 (FIG. 5C) settable input bit to begin image capture. The bit's active time can be any length. This may be helpful when the operating system running on the processor 540 is not real time. Hence, the active time can vary based on the load on the processor 540.

A start signal is sent from the processor to an active edge detector 1206, which then sends a signal to activate the imager and illuminator timing controller 1208 when the active edge is detected. The imager and illuminator timing controller 1208 uses values in the control registers 1204 accessible via I2C bus 1202 to generate an imager exposure start output and an illuminator trigger output.

Figure 13:
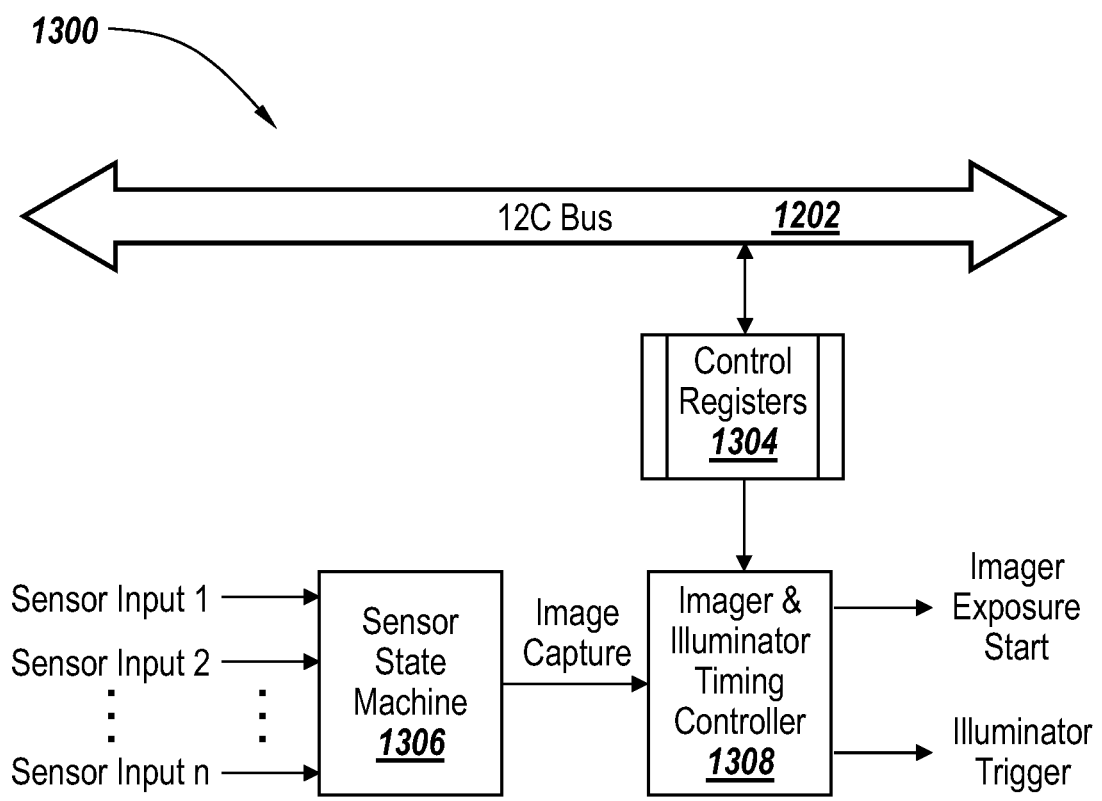
FIG. 13 depicts the interaction among components when image capture is triggered by a sequence of discrete external events in an exemplary vehicle imaging system.

FIG. 13 depicts a case in which multiple sensor values are deployed to trigger image capture. For certain applications, multiple sensors are needed. The components 1300 include the I2C bus 1302 as well as a hardware control register 1304. Components also include a sensor state machine 1306 and an imager and illuminator timing controller 1308. The sensor state machine 1306 receives input from multiple sensors designated as sensors 1 to n in FIG. 13. The sensor state machine 1306 is present in the FPGA 520 (FIG. 5B) and generates an image capture output that is passed to the imager and illuminator timing controller 1308. The imager and illuminator controller 1308 uses values in the control registers 1304 to generate the image exposure start output and illuminator trigger output.

As was mentioned previously, the vehicle imaging system may take many forms. The flowcharts that follow show steps performed for different areas of these forms.

Figure 14:
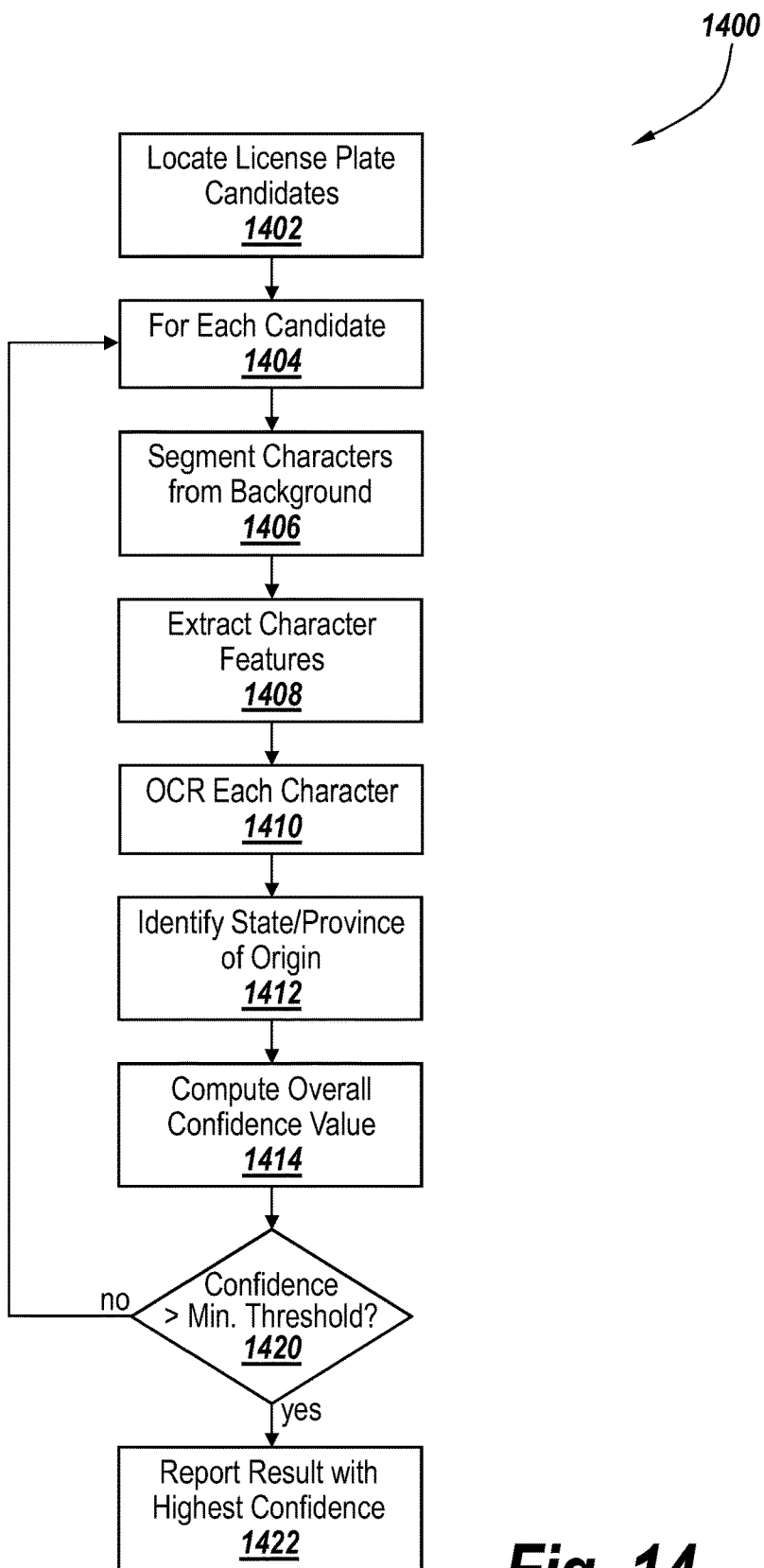
FIG. 14 is a flowchart indicating steps performed when the vehicle imaging system is a license plate recognition system in an exemplary embodiment.

FIG. 14 illustrates the steps that are performed in analyzing license plate images in a license plate recognition system in accordance with an exemplary embodiment. The image is processed to locate potential license plate image candidates in step 1402. For each candidate (step 1404) characters in the image are segmented from the background in step 1406. Character features are then extracted in step 1408 from the segments and optical character recognition is performed on each character in step 1410. Based upon the characters that are recognized, the state or province of origin of the license plate is identified in step 1412. An overall confidence value is calculated for the recognition in step 1414. The overall confidence value that is calculated captures the expected accuracy of both the OCR result and the state or province of origin determination. In practice, the higher the confidence value associated with a read result, the lower the likelihood that the result will be incorrect. The calculation of the confidence value takes into account several criteria, including how well each character resembles the ideal shape of the associated OCR result, along with how well the license plate in question resembles any of the several hundred different license plate styles issued by the jurisdiction identified by the license plate recognition algorithms. This confidence value is compared to a minimum threshold in step 1420. If the confidence value is too low, the next candidate is obtained in step 1404 and the process is repeated on the new candidate beginning with step 1406. On the other hand, if the confidence exceeds the minimum threshold, the result with the highest confidence value is reported in step 1422.

Figure 15:
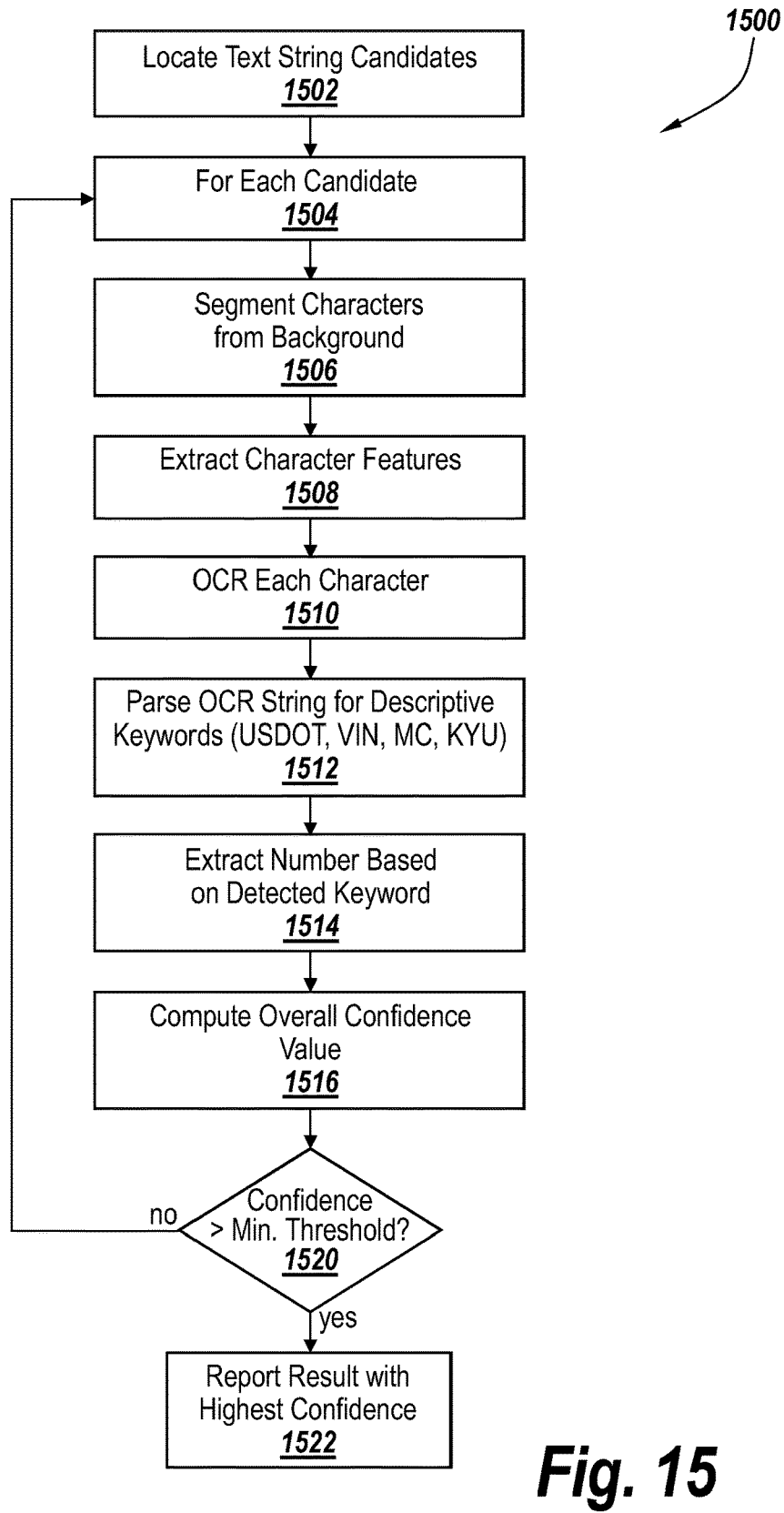
FIG. 15 is a flowchart illustrating steps that are performed when the vehicle imaging system is a Department of Transportation reader system in an exemplary embodiment.

FIG. 15 shows steps to analyze the vehicle images for the DOT reader system in an exemplary embodiment. First, in step 1502, text string candidates are located within the image of the vehicle. For each text string candidate (step 1504), characters are segmented from the background in step 1506. Character features are extracted from the segments in step 1508 and optical character recognition is performed for each character in step 1510. The resulting characters are then parsed for descriptive key words that may be found within DOT identifiers in step 1512. The DOT number is extracted based on the key words in step 1514. An overall confidence value is calculated for the extracted number in step 1516. Here, the confidence value captures the proximity to the corresponding descriptive keyword, like USDOT, VIN, MC, or KYU, in addition to how well each character resembles the ideal shape of the associated OCR result. This confidence value is compared with the minimum threshold in step 1520. If it is below a threshold, the process is repeated for the next candidate in step 1504. The result with the highest confidence value is reported in step 1522.

Figure 16:
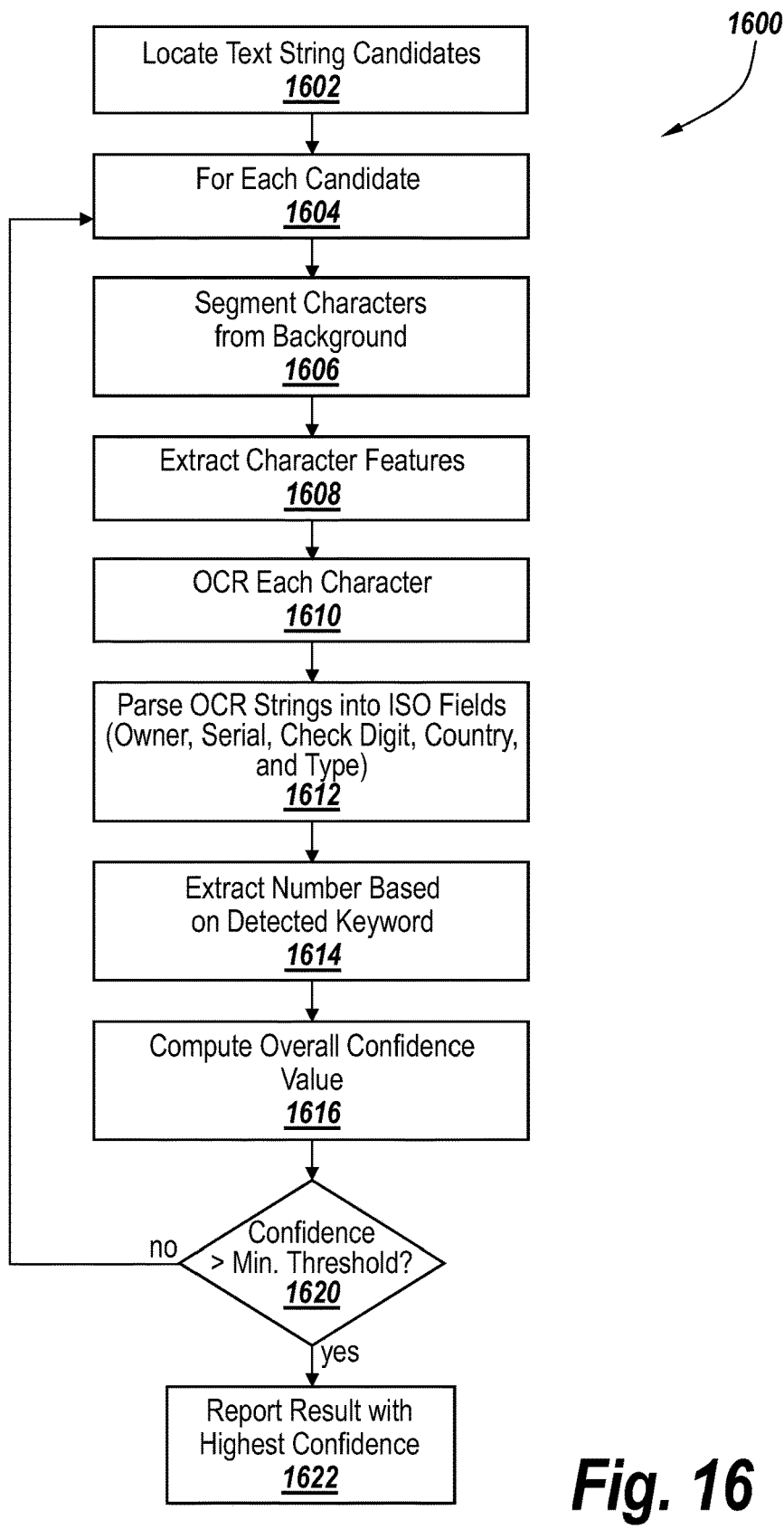
FIG. 16 is a flowchart illustrating the steps that are performed when the vehicle imaging system is a container code reader system in an exemplary embodiment.

FIG. 16 is a flowchart that depicts steps performed when the vehicle imaging system is a container code reader system. Text string candidates are located in the container image in step 1602. For each candidate identified (step 1604), the characters are segmented from the background in step 1606. Character features are extracted in step 1608 and optical character recognition is performed for each character in step 1610. The resulting streams are parsed into ISO fields, such as owner, serial number, check digit, country and type in step 1612. The fields are extracted based on location and format in step 1614. An overall confidence value is calculated in step 1616 and is compared to a minimum threshold in step 1620. If the confidence value is below the minimum threshold, the process is repeated beginning at step 1604 with the next candidate. If the confidence value is over the threshold, the result of the highest confidence value is reported in step 1622.

While the present invention has been described with reference to exemplary embodiments therein, those skilled in the art will appreciate that various changes in form and detail may be realized without departing from the intended scope of the invention as defined in the appended claims.

The invention claimed is:

1. A license plate recognition system, comprising:
a first circuit board having components for capturing an image of a vehicle wherein the first circuit board includes a C lens mount, a lens mounted on the C lens mount and an imaging sensor;
a second circuit board mechanically and electrically coupled to the first circuit board having components for analyzing the image of the license plate captured by the first circuit board, wherein the analyzing includes locating a location of a license plate in the captured image and performing optical character recognition on the characters in the license plate to identify characters in the image for the license plate of the vehicle; and
a housing enclosing both the first circuit board and the second circuit board.

2. The license plate recognition system of claim 1, wherein the components of the first circuit board include an imaging device for capturing the images of the vehicles.

3. The license plate recognition system of claim 2, wherein the components of the first circuit board include control logic for the imaging device.

4. The license plate recognition system of claim 2, wherein the components of the first circuit board include control logic for an illuminator for illuminating the vehicles.

5. The license plate recognition system of claim 4, wherein the control logic of the illuminator is implemented in hardware.

6. The license plate recognition system of claim 5, wherein the control logic of the illuminator is implemented in a field programmable gate array (FPGA).

7. The license plate recognition system of claim 6, wherein the control logic of the imaging device is implemented in hardware.

8. The license plate recognition system of claim 7, wherein the control logic of the imaging device is implemented in a field programmable gate array (FPGA).

9. The license plate recognition system of claim 5, wherein the control logic of the imaging device and control logic of an illuminator include synchronization logic for synchronizing operation of the illuminator with the operation of the imaging device.

10. The license plate recognition system of claim 1, wherein the components of the first circuit board include a digitizer for digitizing the images.

11. The license plate recognition system of claim 1, wherein the image is configured to capture front and/or rear images of the vehicles.

12. A vehicle imaging system, comprising:
a printed circuit board housing:
components for capturing an image of vehicles, and components for analyzing the captured images, including
a component for performing optical character recognition on text in the captured image;
a C lens mount;
a lens mounted to the C lens mount;
a component for locating one of a license plate, a container code, a hazardous material placard or Department of Transportation number in the captured image; and
a housing for housing the printed circuit board.

13. In a vehicle imaging system, a method comprising:
setting values in hardware in the vehicle imaging system, wherein the values capture the delay between when an illuminator is triggered and when the illumination is produced and the delay between when a sensor is instructed to start an exposure and when the exposure starts; and synchronizing the illumination provided by the illuminator and the exposure by the sensor using hardware control logic based on the set values.

\* \* \* \* \*